(12) United States Patent
Pul

(10) Patent No.: US 10,342,239 B2
(45) Date of Patent: Jul. 9, 2019

(54) FILLED DOUGH PRODUCING APPARATUS

(71) Applicant: George Pul, Las Vegas, NV (US)

(72) Inventor: George Pul, Las Vegas, NV (US)

( * ) Notice: Subject to any disclaimer, the term of this patent is extended or adjusted under 35 U.S.C. 154(b) by 239 days.

(21) Appl. No.: 15/475,129

(22) Filed: Mar. 31, 2017

(65) Prior Publication Data

US 2018/0279626 A1 Oct. 4, 2018

(51) Int. Cl.
*A21C 9/06* (2006.01)

(52) U.S. Cl.
CPC .................... *A21C 9/063* (2013.01)

(58) Field of Classification Search
USPC .............. 425/87; 249/135; 426/94; 99/450.4
See application file for complete search history.

(56) References Cited

U.S. PATENT DOCUMENTS

| | | | | |
|---|---|---|---|---|
| 1,236,998 | A * | 8/1917 | Tommasini | A21C 9/063 99/450.6 |
| 4,160,634 | A * | 7/1979 | Huang | A21C 9/063 425/112 |
| 4,446,160 | A * | 5/1984 | Shinriki | A21C 9/063 426/297 |
| 6,467,403 | B1 * | 10/2002 | Lagares-Corominas | A22C 11/02 222/368 |
| 9,028,240 | B2 * | 5/2015 | Vargas | A21C 9/063 425/324.1 |
| 9,888,693 | B2 * | 2/2018 | Wang | A21C 9/06 |
| 9,980,493 | B2 * | 5/2018 | Lee | A21C 9/063 |
| 2015/0135973 | A1 * | 5/2015 | Pul | A21C 9/063 99/450.6 |

FOREIGN PATENT DOCUMENTS

| | | | |
|---|---|---|---|
| JP | 63-598070 | * | 3/1988 |
| JP | H08-308467 | * | 11/1996 |
| JP | 3635028 | * | 3/2005 |

* cited by examiner

*Primary Examiner* — Nina Bhat

(57) ABSTRACT

Filled dough producing apparatus is disclosed for making a food product, such as baozi, a traditional Chinese food; by folding and constricting close a circular dough wrapper around and encasing its dough filling in an apparatus that comprises a folding tubular assembly made of an assembly of multiple jointed corrugated tubes. Been flexible radially and axially, the filled dough producing apparatus changes shapes by flexing fully opened to expose a filled dough receiving pocket, and by flexing fully closed the receiving pocket into a filled dough cavity.

2 Claims, 6 Drawing Sheets

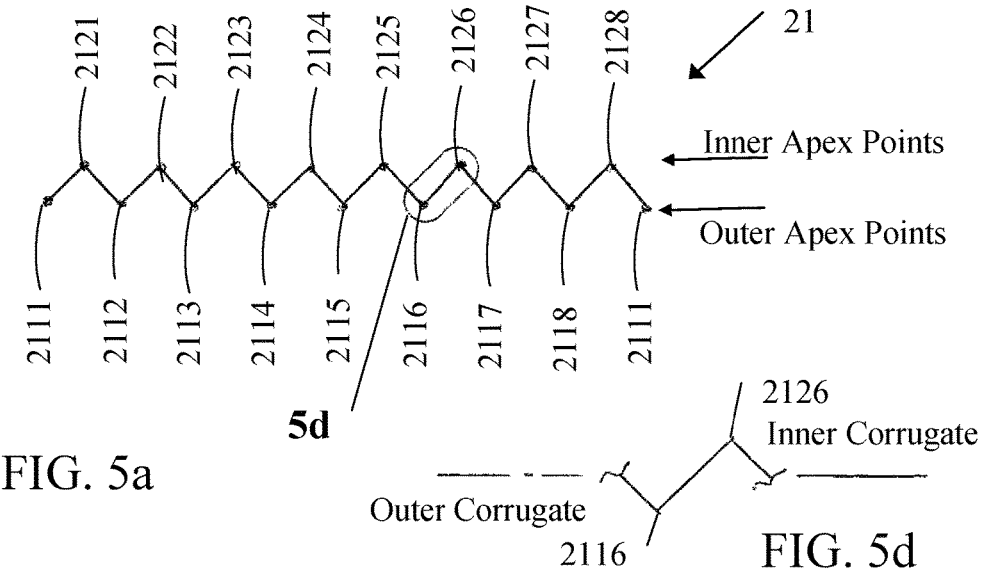
FIG. 5a
FIG. 5d
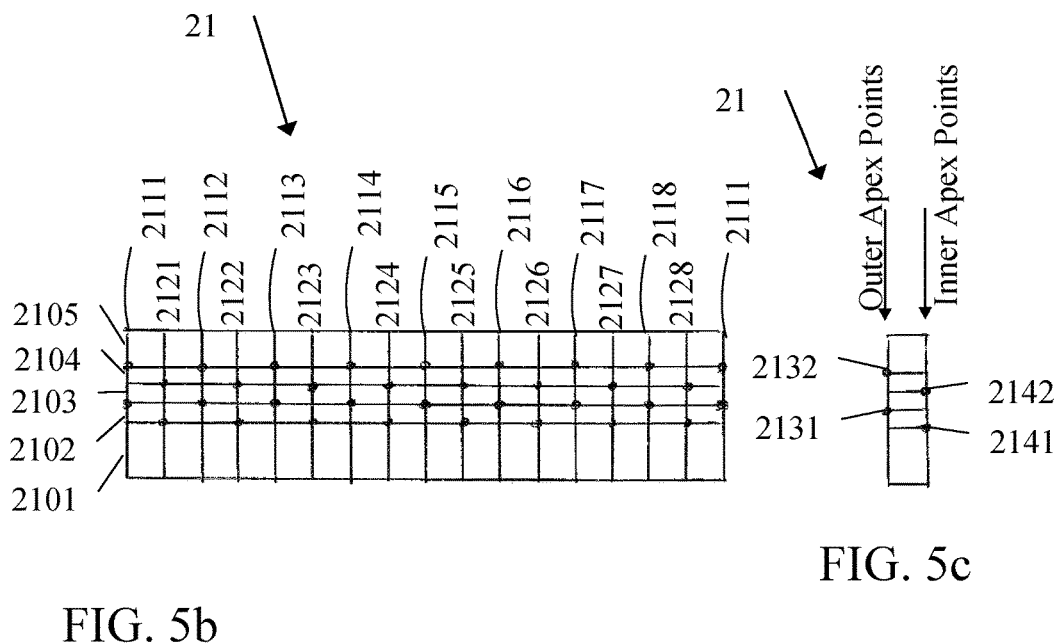
FIG. 5b
FIG. 5c

FILLED DOUGH PRODUCING APPARATUS

BACKGROUND OF THE INVENTION

Baozi is a traditional Chinese food made by folding a flat and circular yeast leavened dough sheet, a dough wrapper, around its filling, and is often steam cooked. The resulting baozi is ball shaped, has many folds at its upper body around the dough wrapper closure, and is smooth at the lower body.

Making a baozi traditionally by hand has been very much like making a handcraft that is time-consuming and requires a relatively high degree of both skill and labor. What is needed in the art is baozi producing apparatus suitable for the everyday consumers.

SUMMARY OF THE INVENTION

The invention is generally directed to a filled dough producing apparatus which, among other things, greatly reduces both the skill and labor required to make a quality baozi. This apparatus of the present invention is unique and substantially simpler than the apparatus described within U.S. Pat. No. 9,572,352 on FILLED DOUGH PRODUCING METHOD.

A filled dough producing apparatus of the present invention comprises: a folding tubular assembly made of a multiple jointed corrugated tubes assembly mounted on top of a non-corrugated base tube through pinned joints. The multiple jointed corrugated tubes assembly further comprises an assembly of lower end, in-between, and upper end corrugated tubes, of mixed cylindrical and conical corrugated tubes in profile view where adjacent tube ends are same in size, and each tube has an upper tube end equal or larger than its lower tube end. A filled dough producing apparatus, been comprised of a single folding tubular assembly by itself without other parts and assemblies, is same as a folding tubular assembly.

A filled dough producing apparatus of the present invention is flexible radially and axially by having a flexible multiple jointed corrugated tubes assembly, where tube corrugates and a pattern of jointed corrugated tubes provides the radial and axial flexibility, respectively. Been both flexible radially and axially, and in combination, the filled dough producing apparatus is made to change shapes between a filled dough receiving pocket and a filled dough cavity, both having a common base or bottom made by the radially restrained lower end corrugated tube mounted onto a non-corrugated tube. In changing shapes to a filled dough receiving pocket, the upper end corrugated tube and some of its adjacent in-between corrugated tubes are inverted. In changing shapes to a larger and smaller filled dough cavity, all and some inverted corrugated tubes, respectively, for a filled dough receiving pocket are inverted back, and the open filled dough receiving pocket is constricting close.

In operation, a dough wrapper with its dough filling on top is placed on top of a filled dough receiving pocket of the dilled dough producing apparatus of the present invention. As the filled dough producing apparatus is moving to close the filled dough receiving pocket, the dough wrapper, being pliable, is partially sandwiches in-between the outer and inner corrugates, with equal numbers for dough wrapper folds and outer and inner corrugates. After the filled dough producing apparatus is fully closed, the dough wrapper is also fully folded around and encasing within its dough filling, resulting in a completed filled dough piece shaped like a ball, has folds at its upper body around the dough wrapper closure, and is smooth at the lower body.

In summary, the present invention of filled dough producing apparatus for a filled dough product employs a multiple jointed corrugated tubes assembly for flexibility both radially and axially to effect shape changes from a filled dough pocket to a filled dough cavity.

BRIEF DESCRIPTION OF THE DRAWINGS

FIG. 5a is top view of unfolded multiple jointed corrugated tubes shown in FIG. 4 viewed along line 5a-5a;

FIG. 5b is side view of unfolded multiple jointed corrugated tubes;

FIG. 5c is end view of unfolded multiple jointed corrugated tubes;

FIG. 5d is enlarged view of a typical outer and inner corrugates taken from view 5d of FIG. 6a;

DESCRIPTION OF THE PREFERRED EMBODIMENT

Figure 1:
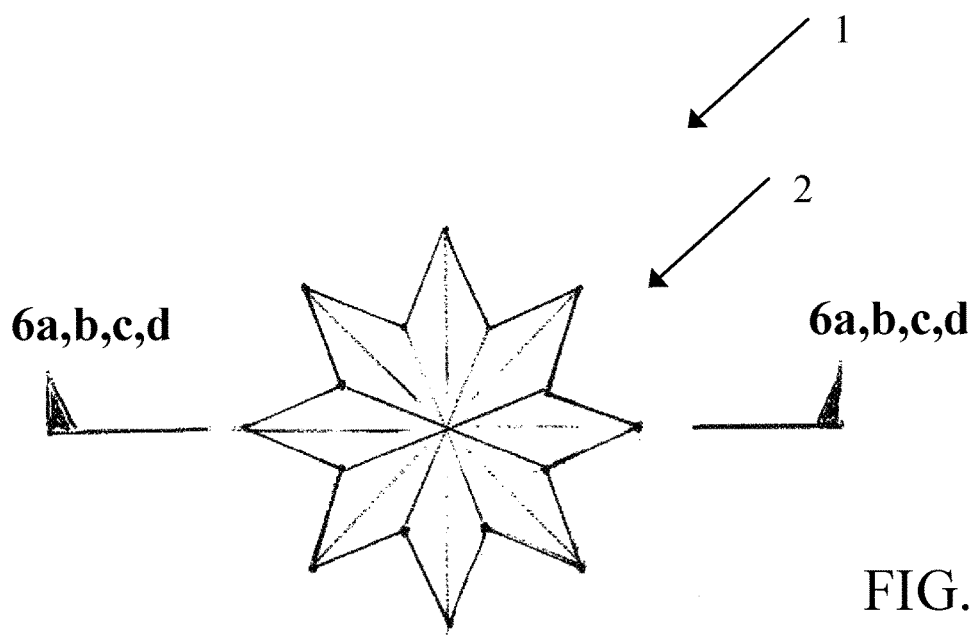
FIG. 1 is top view of the embodiment in neutral position.

Embodiments of the invention fold and close a dough wrapper around its filling in producing a filled dough piece facilitated by the creation of an open receiving pocket and the constricting close of the receiving pocket into a closed cavity by using the apparatus described herein. An embodiment of the invention will now be described with reference to the drawings.

Unless otherwise apparent, or stated, directional references, such as "inner," "inward," "outer," "outward," "downward," "upper", "lower" etc., are for non-limiting descriptive purposes and intended to be relative to the orientation of a particular embodiment of the invention as shown in the view of that embodiment. Parts shown in a given FIGURE are generally proportional in their dimensions.

Referring to FIGS. 1-6, filled dough producing apparatus 1 comprises a folding tubular assembly 2 made of a multiple jointed corrugated tubes assembly 21 mounted on top of a non-corrugated base tube 22 through pinned joints 23. Filled dough producing apparatus 1, been comprised of a single folding tubular assembly 2 by itself without other parts and assemblies, is same as a folding tubular assembly 2. Filled dough producing apparatus 1, being flexible radially and axially, is made for shape changes from been fully opened with a filled dough pocket to been fully closed with a filled dough cavity.

Figure 4:
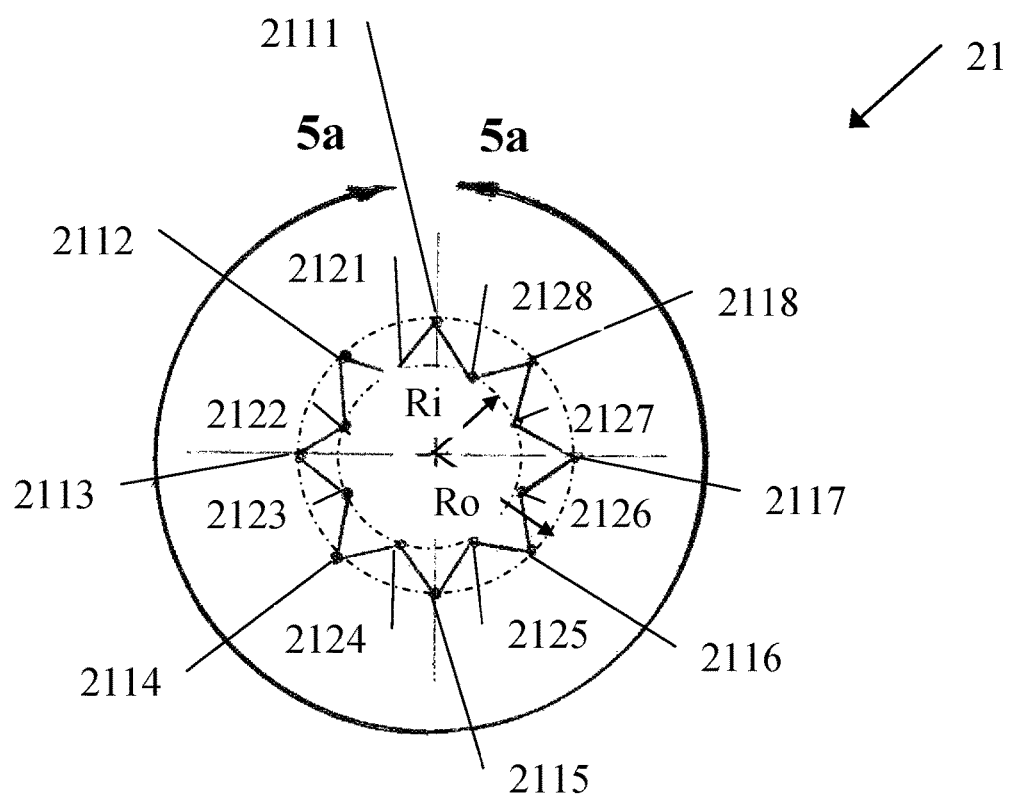
FIG. 4 is top view of multiple jointed corrugated tubes prior to attachment to its non-corrugated base tube.

Shown particularly in FIG. 4 and FIGS. 5a, b, c, d are multiple jointed corrugated tubes assembly 21, prior to mounting on and been restrained by non-corrugated base tube 22, comprising 5 jointed corrugated tubes 2101, 2102 to 2104, and 2105 for lower end, in-between, and upper end corrugated tubes, respectively, and each of which is made of a resilient yet flexible material, has an upper and a lower tube ends, made of 8 equal outer and inner corrugates of same shape and sizes, equally spaced around the peripheral of the corrugated tube, and having a set of 8 outer and 8 inner corrugate apex points 2111 to 2118, 2121 to 2128, respectively, at each of the two upper and lower tube ends. Corrugated tubes 2101 to 2105 are cylindrical tubes in profile with same sized upper and lower tube ends, where the tubes have constant corrugated tube outer radius Ro for all outer corrugate apex points 2111 to 2118 and inner radius Ri for all inner corrugate apex points 2121 to 2128, shown in FIG. 4. And each of corrugated tubes 2101 to 2105 is flexible in radial inward and outward movement, and is invertible between its inner and outer corrugates and surfaces, that is, turned inside out, that is, for a given corrugated tube, after inverted, what was inner corrugates or surface becomes outer corrugates and surface.

Multiple jointed corrugated tubes assembly 21 has adjacent corrugated tubes pin jointed together in a pattern, where sets of 8 pin joints 2131 and 2132 connect sets of 8 alternate outer corrugated apex points 2111 to 2118, and sets of 8 pin joints 2141 and 2142 connect sets of 8 alternate inner corrugated apex points 2121 to 2128. The pin connected joints 2131 and 2132 for outer corrugated apex points 2111 to 2118 are between adjacent tubes 2102 and 2103, and 2104 and 2105. The pin connected joints 2141 and 2142 for inner corrugated apex points 2121 to 2128 are between adjacent tubes 2101 and 2102, and 2103 and 2104. Such a pattern of pin joints provides multiple jointed corrugated tubes assembly 21 the flexibility in axial extension and contraction, in addition for been flexible in radial outward and inward movement.

Multiple jointed corrugated tubes assembly 21, prior to mounting to non-corrugated base tube 22, is flexible in both radial outward and inward movement and in axial extension and contraction.

Figure 2:
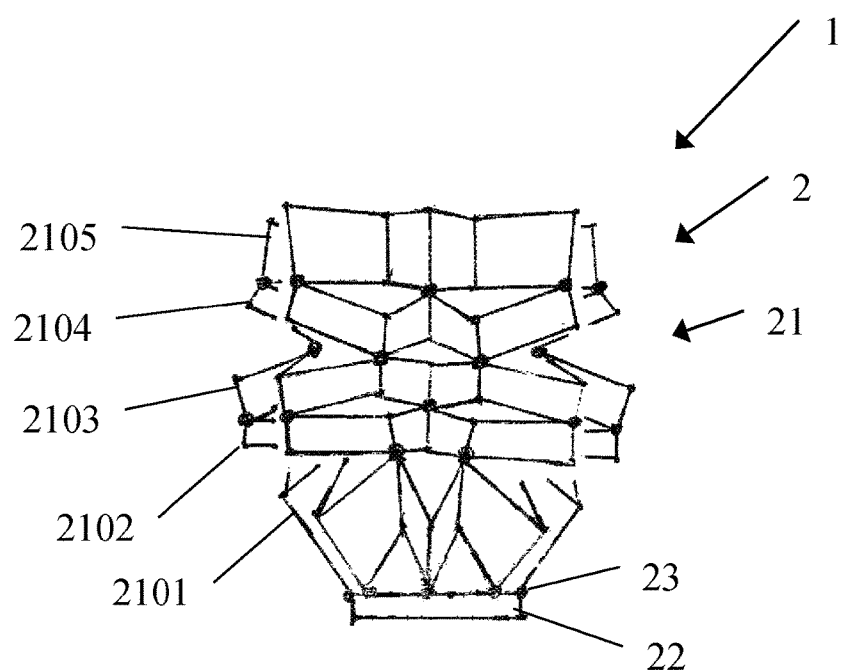
FIG. 2 is side view of the embodiment in neutral position.
Figure 3:
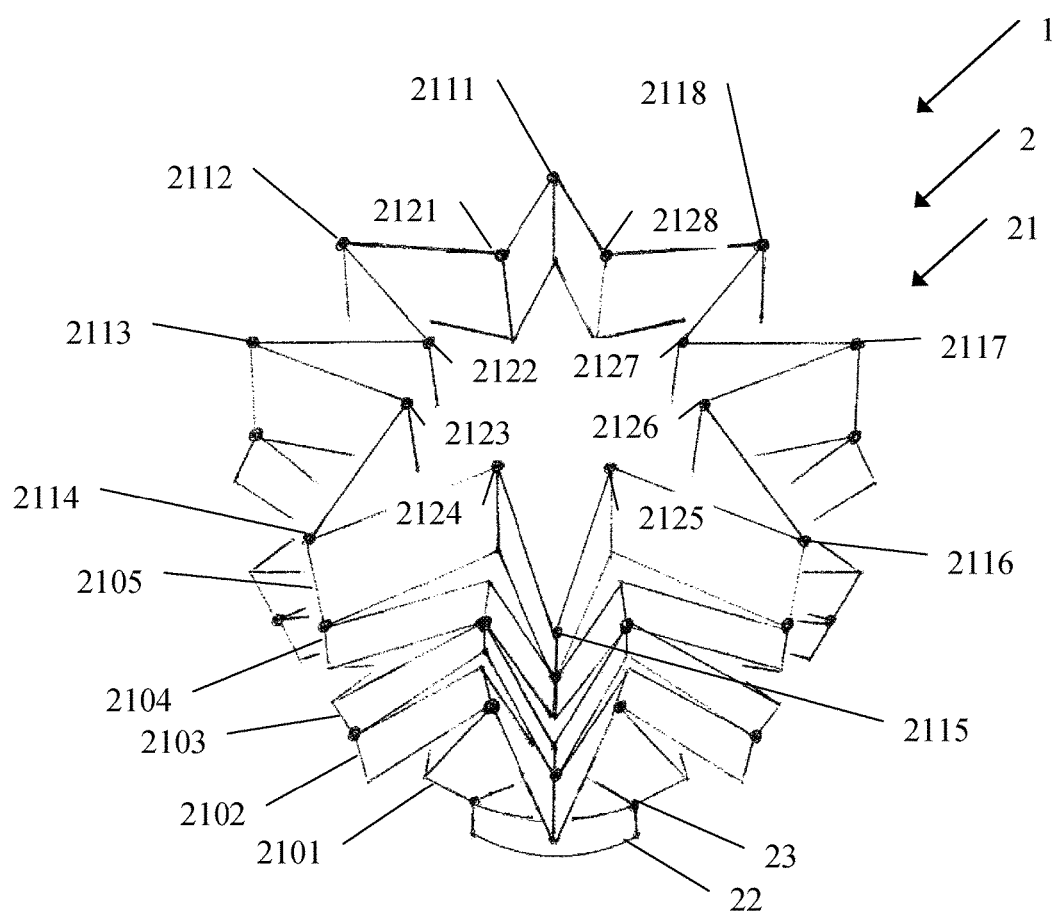
FIG. 3 is perspective view of the embodiment in neutral position.

After mounting multiple jointed corrugated tubes assembly 21 onto non-corrugated base tube 22 through pin joints 23 as shown in particular by FIG. 2 and FIG. 3, only the lower end corrugated tube 2101, mounted directly onto non-corrugated base tube 22, is radial constrained and prevented from fully inverting its outer and inner corrugates and surfaces; but the constrained lower end corrugated tube 2101 has minimal radial and no axial impact on the flexible multiple jointed corrugated tubes assembly 21. Filled dough producing apparatus 1, same as its folding tubular assembly 2, by having a flexible multiple jointed corrugated tubes assembly 21, has combined flexibility in radial outward and inward movement and axial extension and contraction, and are made for shape changes from been fully opened with a filled dough pocket to been fully closed with a filled dough cavity.

Figure 6A:
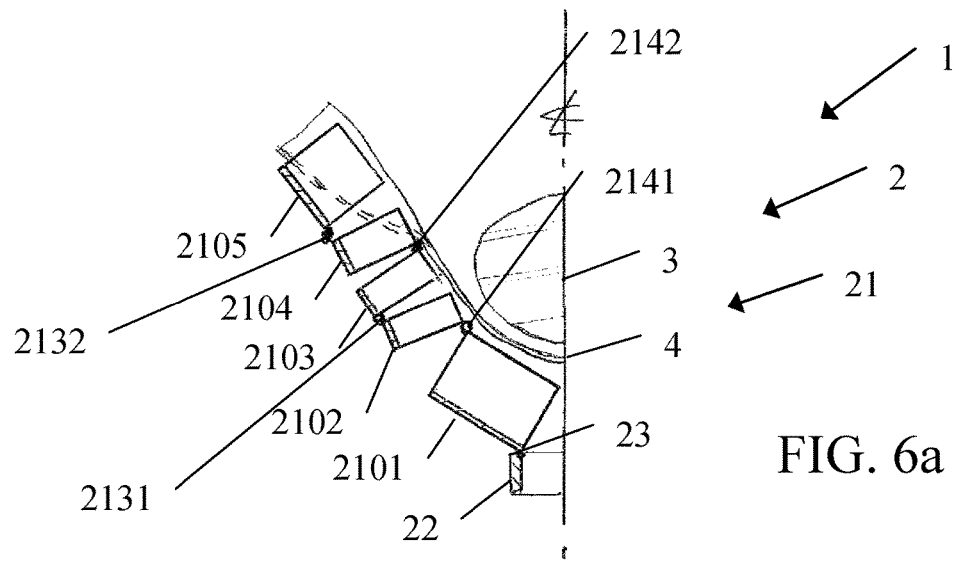
FIGS. 6a, b, c and d are cross section views of the embodiment shown in FIG. 1 taken along line 6a,b,c,d-6a, b,c,d showing the embodiment in motion between neutral resting position shown in FIG. 6a, fully opened position exposing a receiving pocket shown in FIG. 6b; fully constricted closed position forming a larger cavity shown in FIG. 6c and a smaller cavity shown in FIG. 6d.
Figure 6B:
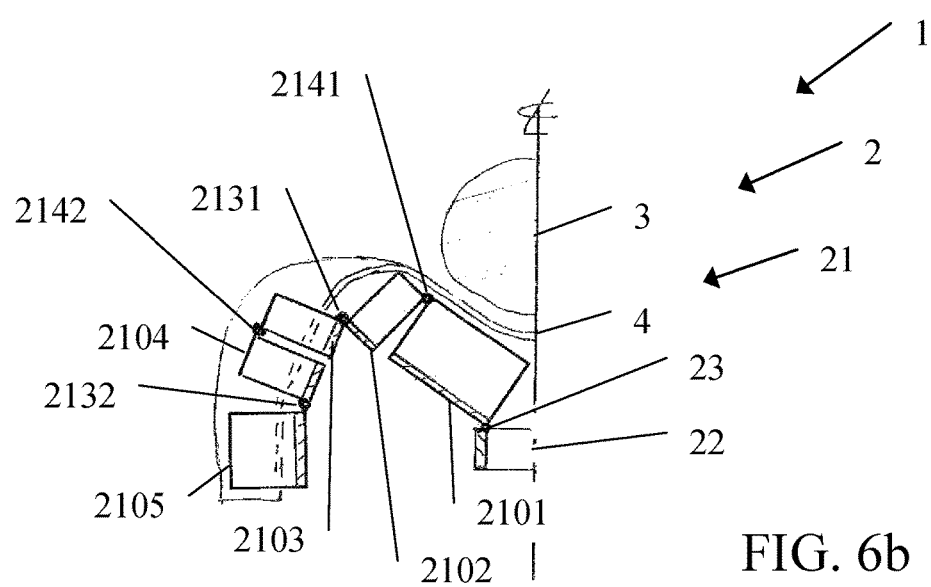
Figure 6C:
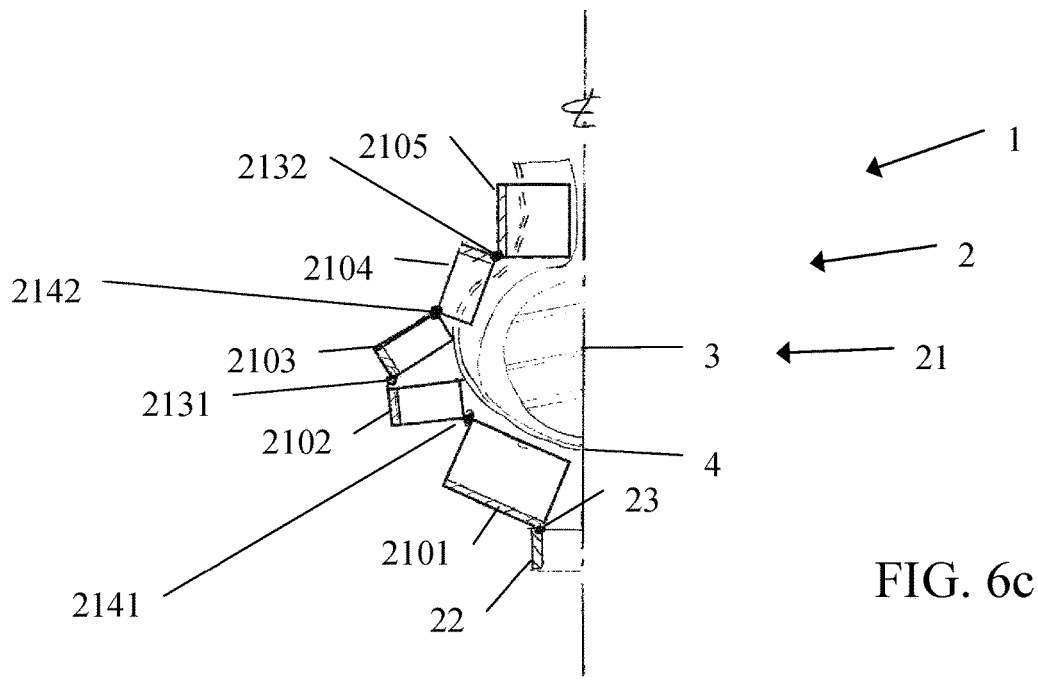
Figure 6D:
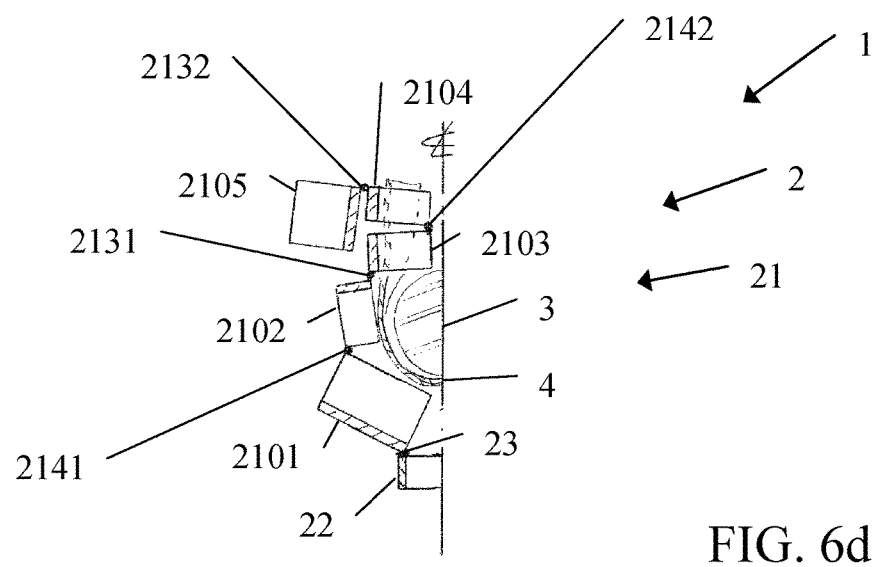

Filled dough producing apparatus 1, same as its folding tubular assembly 2, dough wrapper 3, and dough filling 4 in motion and in operation change shapes and make a filled dough piece as illustrated by cross section views of the embodiment in FIGS. 6a, b, c, and d. The cross section views in these 4. Figures also show relevant corrugates of corrugated tubes 2101 to 2105 as well as folds of dough wrapper 3 adjacent to the cross section cut. Dough wrapper 3, being pliable, has its shape generally conforming to filled dough producing apparatus 1 as it is in motion to change shapes, and dough wrapper 3 toward its peripheral is partially sandwiched in-between by 8 outer and inner corrugates, giving 8 folds to dough wrapper 3. From neutral resting position shown in FIG. 6a, filled dough producing apparatus 1 alone, without dough wrapper 3 and filling 4, is flexed to fully opened position exposing a receiving pocket shown in FIG. 6b for the placement of dough wrapper 3 and dough filling 4 on top. In changing shape to a filled dough receiving pocket, the upper end corrugated tube 2105 and its two adjacent in-between corrugated tubes 2104 and 2103 have their outer and inner corrugates and surfaces inverted. With dough wrapper 3 and dough filling 4 on top placed on top of the fully opened filled dough receiving pocket, filled dough producing apparatus 1 is flexed to fully closed position forming a larger and smaller cavity as shown in FIG. 6c and FIG. 6d, respectively, and also shown in the Figures are dough wrapper 3 fully folded around and encasing within its dough filling 4. For larger and smaller cavities, all three inverted corrugated tubes 2105, 2104, and 2103, and only corrugated tubes 2104 and 2103 are inverted back, respectively. The resulting completed filled dough piece is ball shaped, has 8 folds at its upper body around the dough wrapper closure, and is smooth at the lower body.

Thus filled dough producing apparatus 1 of the present invention may be employed in producing a filled dough piece like a traditional Chinese baozi. Filled dough producing apparatus 1 includes features for flexing shape changes to form in one fully opened position a filled dough receiving pocket and in another fully closed position a filled dough closed cavity, and for controlling the folding operation.

The embodiments described above are for the purpose of describing features and technical conceptions of the apparatus of the invention, but it should be readily apparent that the invention is not limited to the described embodiments alone. A person skilled in the art may come up with various changes and modifications consistent to the technical concept disclosed herein and within the spirit and scope of the invention. Therefore, it is to be understood that modifications and variations may be utilized without departure from the spirit and scope of the invention disclosed herein, as those skilled in the art will readily understand. Such modifications and variations are considered to be within the purview and scope of the claimed invention and their equivalents.

I claim:

1. A flexible molding apparatus for producing a filled dough product comprising an assembly including a plurality of multiple jointed pleated tubes mounted on top of a base tube connected by a pin joints wherein each pleated tube has pleats having an upper and lower tube end; wherein said pleats are arranged circumferentially forming the pleated tube wherein the upper and lower tube ends has pleat apexes which alternate between outer and inner pleats and wherein the pleats are pin joined between adjacent tubes in an pattern and wherein for all outer pleats apexes at one tube end are pin jointed and then all inner pleats at the other tube end are pin jointed; wherein the pin joints permit flexible, radial and axial movement in said assembly and permits the assembly to be inverted and wherein the assembly in one inverted position provides a filled dough receiving cavity to receive a dough wrapper and filling, and in the other inverted position, the assembly provides a filled dough cavity to form an encased filled dough product.

2. A method of using the flexible molding apparatus of claim 1 to produce an encased food wherein said method comprises filling the assembly filled dough receiving cavity with a dough wrapper, placing a filling on top of the dough wrapper; inverting the assembly into a filled dough cavity; and flexing said assembly radially and axially to produce an encased filled dough product.

* * * * *